United States Patent [19]

Ball et al.

[11] Patent Number: 4,688,837
[45] Date of Patent: Aug. 25, 1987

[54] ROBOT END EFFECTOR MECHANISM FOR GRIPPING AND HOLDING A FLAT TEXTILE ARTICLE IN A PREDETERMINED ORIENTATION

[75] Inventors: Gregory A. Ball, Mooresville; Byron E. Moore; Dennis L. Starnes, both of Kannapolis, all of N.C.

[73] Assignee: Fieldcrest Cannon, Inc., Eden, N.C.

[21] Appl. No.: 807,856

[22] Filed: Dec. 11, 1985

[51] Int. Cl.⁴ .................... B65H 3/22; B65G 65/04
[52] U.S. Cl. ........................ 294/61; 271/18.3
[58] Field of Search .............. 294/61, 50.5, 50.6, 294/50.7, 50.8, 120, 121, 126; 112/121.15, 121.11, 262.1; 414/117, 730; 271/18.3, 18, 19

[56] References Cited

U.S. PATENT DOCUMENTS

| | | |
|---|---|---|
| 3,232,256 | 2/1966 | Buckalter . |
| 3,433,187 | 3/1969 | Haefele et al. . |
| 3,528,378 | 9/1970 | Westhoff . |
| 3,580,198 | 5/1971 | Teed . |
| 3,722,435 | 3/1973 | Elsas . |
| 4,009,786 | 3/1977 | Littlewood .......................... 294/61 |
| 4,165,811 | 8/1979 | Mainvielle .......................... 294/61 |
| 4,296,699 | 10/1981 | Vartoukian . |
| 4,470,362 | 9/1984 | Kear . |

Primary Examiner—James B. Marbert
Attorney, Agent, or Firm—Bell, Seltzer, Park & Gibson

[57] ABSTRACT

An end effector mechanism is provided which is adapted to be attached to a robot having means for moving the end effector mechanism in at least up and down and forward and reverse paths of travel. The end effector mechanism is characterized by a construction for gripping a generally flat textile article in a predetermined orientation and holding the textile article while maintaining at least one edge thereof in such predetermined orientation during transportation of the textile article by the robot and subsequently releasing the textile article. The end effector mechanism is in the form of a generally U-shaped member having a flat bottom surface for contact with the textile article and having needle gripping devices mounted for inward and outward movement from the forward free ends of the U-shaped member for gripping and releasing the textile article, while holding at least one edge thereof taut and in a predetermined orientation.

12 Claims, 4 Drawing Figures

ROBOT END EFFECTOR MECHANISM FOR GRIPPING AND HOLDING A FLAT TEXTILE ARTICLE IN A PREDETERMINED ORIENTATION

FIELD OF THE INVENTION

This invention relates to an end effector mechanism adapted to be attached to a robot having means for moving the end effector mechanism in at least up and down and forward and reverse paths of travel, and characterized by a construction for gripping a generally flat textile article in a predetermined orientation and holding the textile article while maintaining at least one edge thereof in such predetermined orientation during transportation of the textile article by the robot and subsequently releasing the textile article.

BACKGROUND OF THE INVENTION

Heretofore, robots having end effector mechanisms or gripper mechanisms have been utilized in a number of manufacturing operations for gripping an article in one location, transporting the article to another location and releasing the article. These robots have been effective in facilitating such manufacturing operations and saving labor costs with respect to heretofore performed manual operations. Notwithstanding, such robots with end effector mechanisms have not been utilized to a great extent in textile article fabricating or handling operations since conventional end effector mechanisms on such robots are normally designed for gripping rigid articles and will not function to grip flexible and somewhat fragile textile articles. Moreover, there is a need in many textile fabricating operations, where the articles are to be transported from one location to another, to maintain the textile article or at least the leading edge thereof in a predetermined orientation.

OBJECT AND SUMMARY OF THE INVENTION

Accordingly, it is the object of this invention to provide an end effector mechanism, adapted to be attached to a robot having means for moving the end effector mechanism in at least up and down and forward and reverse paths of travel, which will grip a generally flat textile article in a predetermined orientation and hold the textile article while maintaining at least one edge thereof in such predetermined orientation during transportation of the textile article by the robot and then release the textile article in such predetermined orientation.

It has been found by this invention that the above object may be accomplished by providing an end effector mechanism comprising generally the following.

The end effector mechanism is in the form of a generally U-shaped member having a generally flat bottom surface for contact with the flat textile article and defining first and second forwardly-extending legs having forward free end portions and a third leg extending between and connected at each end thereof to rear ends of the first and second legs.

Needle gripping devices are carried by the first and second legs for outward movement therefrom at respective opposite obtuse angles with respect to the bottom surface of the U-shaped member to penetrate the textile article at respective opposite acute angles with respect to the top surface thereof for gripping of the textile article by the end effector mechanism and holding at least one edge thereof taut, and for inward movement into the U-shaped member for releasing the textile article from the end effector mechanism. Mechanisms are provided for selectively moving the needle gripping devices for the gripping and releasing operations thereof.

Preferably, means are provided for mounting the first and second legs of the U-shaped member for selective outward and inward movement of the free end portions thereof with respect to each other to aid in respective gripping and releasing operations of the end effector mechanism.

BRIEF DESCRIPTION OF THE DRAWINGS

While some of the objects and advantages of this invention have been set forth above, other objects and advantages will appear as the detailed description of a preferred embodiment of this invention continues when taken in conjunction with the accompanying drawings, in which.

DETAILED DESCRIPTION OF PREFERRED EMBODIMENT OF THE INVENTION

Figure 1:
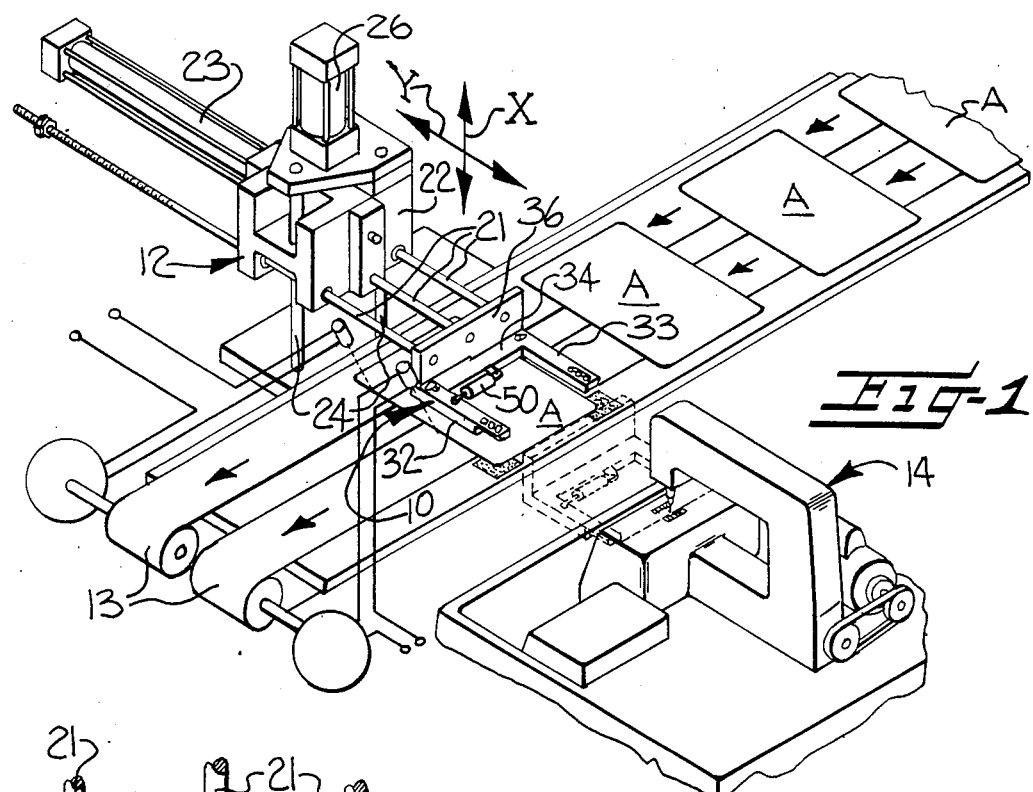
FIG. 1 is a perspective view of a robot having an end effector mechanism constructed in accordance with this invention attached thereto and being positioned for gripping a flat textile article from a conveyor belt and transporting the textile article to a sewing machine mechanism and releasing the textile article.

Referring now to the drawings, an end effector mechanism or gripper mechanism, generally indicated at 10, is illustrated as being attached to a robot, generally indicated at 12. The robot 12 and end effector mechanism 10 are shown in FIG. 1 as being positioned in a textile fabricating mechanism, such as a wash cloth fabricating apparatus. The wash cloth fabricating apparatus includes driven conveyor belt devices 13 which index and position cut generally flat textile articles A into a predetermined orientation under the end effector mechanism 10 of the robot 12 for gripping of the flat textile article A in its predetermined orientation by the end effector mechanism. The end effector mechanism 10 holds the textile article A while maintaining at least one edge thereof in such predetermined orientation and transports the textile article A through the operation of the robot 12 to a sewing machine 14 for releasing of the textile article A into the sewing machine 14 for a stitching operation.

Only a portion of this wash cloth fabricating apparatus is illustrated herein and full details of such apparatus may be seen in copending U.S. Pat. application Ser. No. 799,163, filed Nov. 18, 1985, and assigned to the assignee of the present invention. However, it is to be understood that the end effector mechanism 10 and robot 12 may be utilized in any textile article fabricating or handling operation and the environment illustrated in FIG. 1 is only exemplary.

The robot 12 illustrated in the drawings herein, is constructed for at least up and down and forward and reverse paths of travel, as indicated by the arrows X and Y in FIG. 1. This robot 12 may be in the form of any commercially-available robot which provides at least the up and down and forward and reverse paths of travel. The particular robot 12 illustrated in FIG. 1 is of the same type shown and described in the above-mentioned copending United States Patent Application and further reference may be had thereto.

Briefly, the robot 12 is adapted to have the end effector 10 attached or mounted on the ends of rods 21 which extend through a robot frame block 22 and which carries a fluid-operated piston and cylinder mechanism 23 on the other end thereof to effect the forward and reverse horizontal movement of the end effector 10 in the direction of the arrow Y. The robot frame block 22 is also mounted on guide rods 24 for up and down vertical movement thereof in the direction of the arrow X by fluid-operated piston and cylinder mechanism 26 so that the end effector mechanism 10 may move from an upward position to a downward position. Fluid may be supplied to each side of the piston and cylinder mechanisms 23, 26 by any suitable control means (not shown).

Robot mechanisms for performing such vertical and horizontal movements are widely commercially available and further explanation of the construction and operation thereof are not believed necessary for an understanding of the present invention.

The end effector mechanism 10 is generally in the form of a U-shaped member having a generally flat bottom surface 31 for contact with the flat textile article A. The generally U-shaped member of the end effector mechanism 10 defines first and second forwardly-extending legs 32, 33 having forward free end portions 32', 33' and a third leg 34 extending between and connected at each end 34', 34" to rear ends 32", 33" of the first and second legs 32, 33. The U-shaped member of the end effector mechanism 10 may also include an upstanding plate 36 for convenient attachment to the ends of rods 21 of the robot 12.

Figure 4:
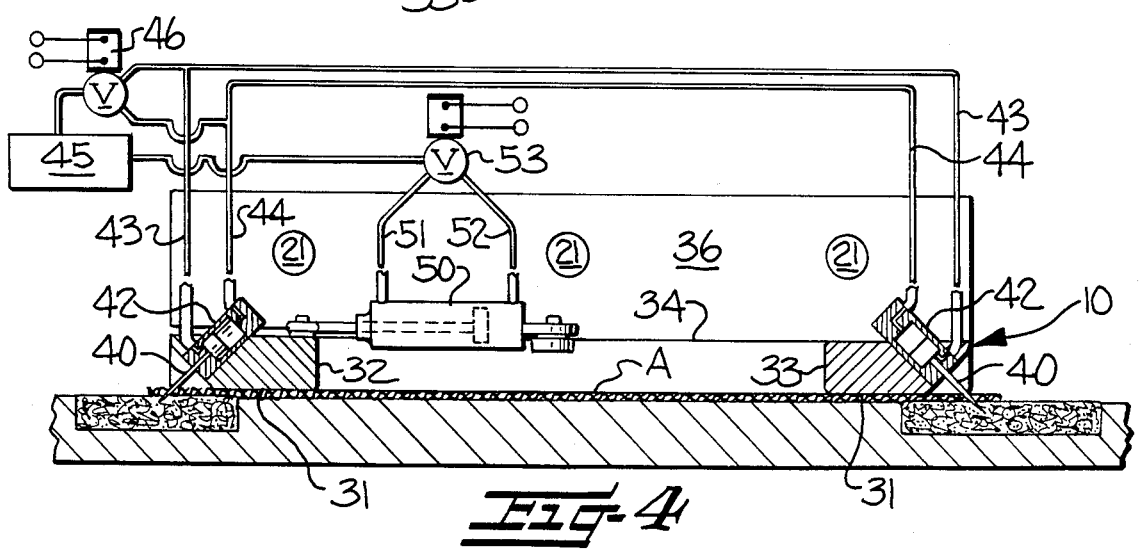
FIG. 4 is a schematic sectional view through the end effector mechanism and illustrating schematically the means for moving the needle gripping devices and for moving the free end portions of the first and second legs of the U-shaped member with respect to each other for gripping and releasing of the textile article.

The end effector mechanism 10 further includes needle gripping means in the form of a plurality of separate needles 40 carried by the first and second legs 32, 33 for outward movement therefrom at respective opposite obtuse angles with respect to the bottom surface 31 of the U-shaped member (FIG. 4) to penetrate the textile article A at respective opposite acute angles with respect to the top surface of such textile article A (FIG. 4) for gripping of the textile article A by the end effector mechanism 10 and holding at least one edge thereof taut, and for inward movement into the U-shaped member for releasing the textile article A from the end effector mechanism 10. Preferably, three of the needles 40 are positioned in generally the free end portions 32', 33' of the first and second legs and a fourth of the needles 40 is positioned in each of the rear ends 32", 33" of the first and second legs 32, 33.

The end effector mechanism 10 further includes means for selectively moving the needle gripping means which preferably comprises separate fluid-operated piston and cylinder mechanisms 42 carried by each of the first and second legs 32, 33 and respectively attached to each of the needles 40.

The means for selectively moving the needle gripping means further includes fluid supply means in the form of fluid conduits 43, 44 connected to each side of the cylinder of each of the piston and cylinder means 42 and leading from a suitable source of pressurized fluid 45 through selectively-actuatable valve means in the form of a solenoid-operated valve 46 for being actuated to selectively direct pressurized fluid to each side of the cylinder of each of the piston and cylinder means 42 for the desired gripping and releasing operations of the needle gripping means.

The end effector mechanism 10 further includes means mounting the first and second legs 32, 33 of the U-shaped member for selective outward and inward movement of the free end portions 32', 33' thereof with respect to each other to aid in the respective gripping and releasing operations of the end effector mechanism 10. This means preferably includes pivot means 48 connecting one end 34' of the third leg 34 with the rear end 32" of one of the first and second legs 32 so that the one of the first and second legs 32 is movable with respect to the third leg 34 and the other of the first and second legs 33. The connection between the other end 34" of the third leg 34 and the rear end 33" of the other of the first and second legs 33 is an integral connection. Obviously, this pivot connection and integral connection could be reversed between the first and second legs 32, 33 and the third leg 34.

The means mounting the first and second legs 32, 33 of the U-shaped member for selective outward and inward movement of the free end portions 32', 33' thereof further includes fluid-operated piston and cylinder means 50 connected between the third leg 34 and the one of the first and second legs 32 which is pivotally connected to the third leg 34. The fluid supply means in the form of fluid conduits 51, 52 is connected to each side of the cylinder of the piston and cylinder means 50 from the pressurized fluid supply 45 and through a selectively-actuatable valve means in the form of a solenoid-operated valve 53 for being actuated to selectively direct pressurized fluid to each side of the cylinder of the piston and cylinder means 50 for the desired outward and inward movement of the free end portions of the U-shaped member.

Figures 2, 3:
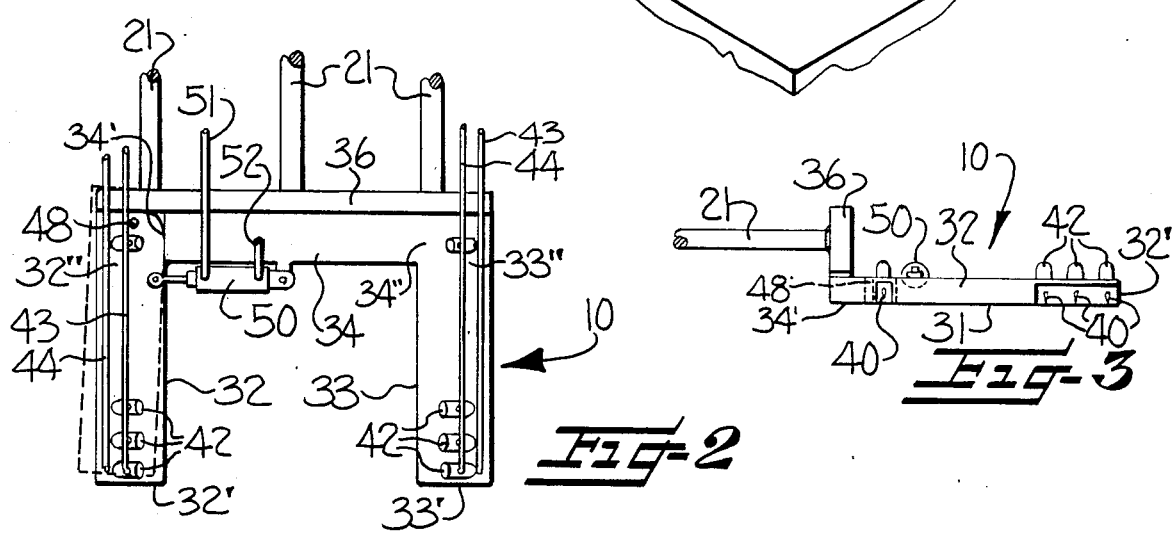
FIG. 2 is a top plan view of the end effector mechanism illustrated in FIG. 1.
FIG. 3 is a side elevational view of the end effector mechanism illustrated in FIG. 2.

Thus, an end effector mechanism 10 has been provided which is generally in the shape of a U-shaped member and in which the flat bottom surface 31 thereof may be brought into contact with a generally flat textile article A in a predetermined orientation. Needle gripping means may be actuated by actuation of solenoid-operated valve 46 to direct fluid under pressure through a conduit 44 to one side of the cylinder of piston and cylinder mechanisms 42 to move the needles 40 of needle gripping means outwardly from the U-shaped member for penetrating the textile article A in its predetermined orientation. If desired, a soft pourous member may be provided under the textile article A (FIG. 4) to aid in such penetration by the needles 40. Thereafter or simultaneously therewith, one of the first and second legs 32 may be moved outwardly (dotted line position shown in FIG. 2) by actuation of solenoid-operated valve 53 to direct pressurized fluid from supply source 45 to one side of the cylinder of piston and cylinder mechanism 50 to move the one leg 32 about its pivot 48 with the third leg 34 resulting in the needles 40 of needle gripping means pulling the at least one edge of the textile article A in its predetermined orientation taut. Robot 12 may then be actuated to lift the gripped textile article A in a vertical direction and then transport the textile article A in a horizontal direction and to a further fabricating or handling mechanism in the textile article fabricating or handling operation. The solenoid-operated valves 46, 43 may then again be actuated to reverse the above described movement of the needles 40 of the needle gripping means and the leg 32 of the U-shaped member for releasing the textile article A.

In the drawings and specification there has been set forth a preferred embodiment of this invention, and although specific terms are employed, they are used in a generic and descriptive sense only and not for purposes of limitation, the scope of the invention being defined in the following claims.

What is claimed is:

1. End effector mechanism adapted to be attached to a robot having means for moving said end effector mechanism in at least up and down and forward and reverse paths of travel, and characterized by a construction for gripping a generally flat textile article in a predetermined orientation, holding the textile article while maintaining at least one edge thereof in such predetermined orientation during transportation thereof by the robot and subsequently releasing the textile article; said end effector mechanism comprising:

a generally U-shaped member having a generally flat bottom surface of the U-shaped configuration for contact with the flat textile article and defining first and second forwardly-extending legs having forward free end portions and a third leg extending between and connected at each end thereof to rear ends of said first and second legs; and needle gripping means carried by said first and second legs for outward movement therefrom at respective opposite obtuse angles with respect to said bottom surface of said U-shaped member to penetrate the textile article at respective opposite acute angles with respect to the top surface thereof for gripping of the textile article by said end effector mechanism and holding the at least one edge thereof taut, and for inward movement into said U-shaped member for releasing the textile article from said end effector mechanism;

means for selectively moving said needle gripping means in the outward and inward directions; and means mounting said first and second legs of said U-shaped member for selective outward and inward movement of said free end portions thereof with respect to each other to aid in the respective gripping and releasing operations of said end effector mechanism.

2. End effector mechanism, as set forth in claim 1, in which said needle gripping means comprise a plurality of separate needles carried by each of said first and second legs.

3. End effector mechanism, as set forth in claim 2, in which three of said needles are positioned in each of said free end portions of said first and second legs and a forth of said needles is positioned in each of said rear ends of said first and second legs.

4. End effector mechanism, as set forth in claim 2 or 3, in which said means for selectively moving said needle gripping means comprises separate fluid-operated piston and cylinder means carried by said first and second legs and respectively attached to each of said needles.

5. End effector mechanism, as set forth in claim 4, in which said means for selectively moving said needle gripping means further includes fluid supply means connected to each side of the cylinder of each of said piston and cylinder means and selectively-actuatable valve means connected to said fluid supply means for selectively directing fluid to each side of the cylinder of said piston and cylinder means for the desired gripping and releasing operations of said needle gripping means.

6. End effector mechanism, as set forth in claim 1, in which said means mounting said first and second legs of said U-shaped member for selective outward and inward movement of said free end portions thereof includes pivot means connecting one end of said third leg with the rear end of one of said first and second legs so that the one of said first and second legs is movable with respect to said third leg and the other of said first and second legs.

7. End effector mechanism, as set forth in claim 6, in which said means mounting said first and second legs of said U-shaped member for selective outward and inward movement of said free end portions thereof further includes fluid-operated piston and cylinder means connected between said third leg and the one of said first and second legs which is pivotally connected to said third leg, fluid supply means connected to each side of the cylinder of said piston and cylinder means, and selectively-actuatable valve means connected to said fluid supply means for selectively directing fluid to each side of the cylinder of said piston and cylinder means for the desired outward and inward movement of said free end portions of said U-shaped member.

8. End effector mechanism adapted to be attached to a robot having means for moving said end effector mechanism in at least up and down and forward and reverse paths of travel, and characterized by a construction for gripping a generally flat textile article in a predetermined orientation, holding the textile article while maintaining at least one edge thereof in such predetermined orientation during transportation thereof by the robot and subsequently releasing the textile article; said end effector mechanism comprising:

a generally U-shaped member having a generally flat bottom surface for contact with the flat textile article and defining first and second forwardly-extending legs having forward free end portions and a third leg extending between and connected at each end thereof to rear ends of said first and second legs;

a plurality of separate needle gripping means carried by each of said first and second legs for outward movement thereof at respective opposite obtuse angles with respect to said bottom surface of said U-shaped member to penetrate the textile article at respective opposite acute angles with respect to the top surface thereof for gripping of the textile article by said end effector mechanism and holding the at least one edge thereof taut, and for inward movement into said U-shaped member for releasing the textile article from said end effector mechanism;

means for selectively moving said plurality of needle gripping means in the outward and inward directions; and means mounting said first and second legs of said U-shaped member for selective outward and inward movement of said free end portions thereof with respect to each other to aid in the respective gripping and releasing operations of said end effector means and including pivot means connecting one end of said third leg with the rear end of one of said first and second legs so that the one of said first and second legs is movable with respect to said third leg and the other of said first and second legs.

9. End effector mechanism, as set forth in claim 8, in which three of said needles are positioned in each of said free end portions of said first and second legs and a fourth of said needles is positioned in each of said rear ends of said first and second legs.

10. End effector mechanism, as set forth in claim 9, in which said means for selectively moving said plurality of needles comprises separate fluid-operated piston and cylinder means carried by said first and second legs and respectively attached to each of said needles.

11. End effector mechanism, as set forth in claim 10, in which said means mounting said first and second legs of said U-shaped member for selective outward and inward movement of said free end portions thereof further includes fluid-operated piston and cylinder means connected between said third leg and the one of said first and second legs which is pivotally connected to said third leg.

12. End effector mechanism, as set forth in claim 11, in which said means for selectively moving said needle gripping means and said means mounting said first and second legs of said U-shaped member for selective outward and inward movement of said free end portions thereof further include fluid supply means connected to each side of the cylinder of each of said piston and cylinder means, and selectively-actuatable valve means connected in each of said fluid supply means for selectively directing fluid to each side of the cylinder of each of said piston and cylinder means for the desired movement of each of said needle gripping means and said free end portions of said U-shaped member for the gripping and releasing operations of said end effector mechanism.

* * * * *